July 15, 1947.                M. A. DALOTEL                2,423,967
              SIGHTING DEVICE FOR MOVING PICTURE CAMERAS
                         Filed Nov. 15, 1938
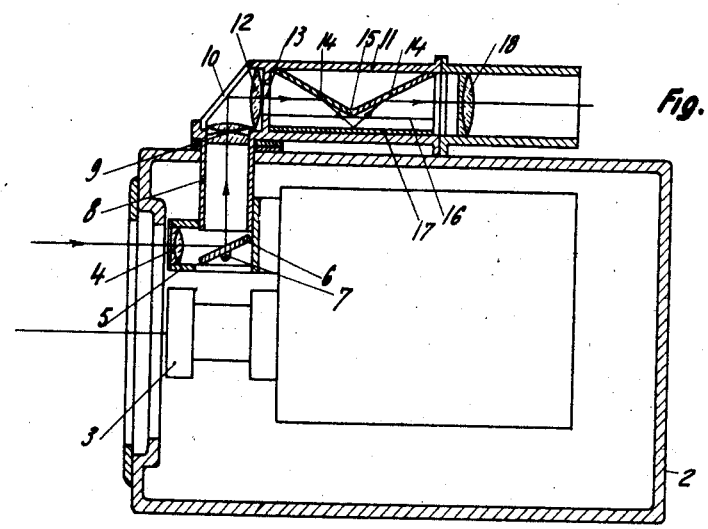
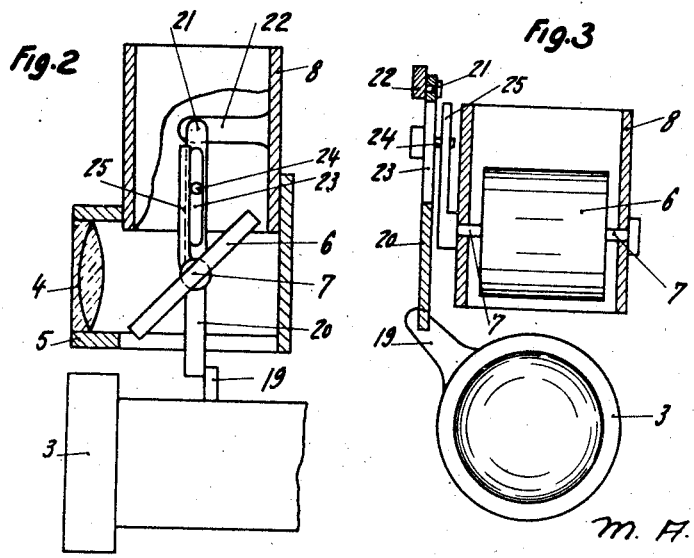
M. A. Dalotel
    Inventor
By: Glascock Downing & Seebold
            Attys.

Patented July 15, 1947

2,423,967

UNITED STATES PATENT OFFICE 2,423,967

SIGHTING DEVICE FOR MOVING PICTURE CAMERAS

Maurice Albert Dalotel, Deuil, France, assignor to Suzanne Rosalie Mathot, Paris, France Application November 15, 1938, Serial No. 240,567
In Germany December 31, 1937

Section 3, Public Law 690, August 8, 1946.
Patent expires December 31, 1957

2 Claims. (Cl. 95—44)

The present invention relates to a sighting device for moving picture cameras, capable of giving, at any moment, an image of the cinematographed scene, which is an exact reproduction of the image projected on the film, such a sighting device comprising an eyepiece or ocular constituted by a large lens, in which the casting director or his assistant may watch and follow the scene without being obliged to place his eye against the eyepiece, nor exactly in the optical axis of the latter, and without, therefore, disturbing the camera operator.

The present invention concerns the type of sighting devices with a large eyepiece arranged outside the camera and at a certain distance from the camera objective, and it has for its object to remedy to the parallactic error due to the distance separating the view finder from the camera objective, and the effect of which is that the images given by the view finder and the objective respectively, although having the same front plane, will have entirely different backgrounds, so that it is impossible, during the taking of the picture, to get an exact idea of the image actually obtained on the film. The sighting device according to the invention is characterized by the fact that it comprises an objective arranged on the front side of the camera, immediately next to the camera objective, and, between this sighting objective and the eyepiece, deflecting means suitably controlled by the focussing of the camera objective.

Due to this arrangement, it is possible to reduce the distance between the axis of the camera objective and that of the sighting objective to a very small amount, viz.: less than 100 mm., so that the parallactic error will be practically eliminated, even at the shortest distances used for taking pictures.

By way of example, there has been described below and represented on the annexed drawing an embodiment of the sighting device object of the invention.

Figure 1 shows at a larger scale, in horizontal section, the device according to the invention.

Figures 2 and 3 show respectively in longitudinal and transverse section the means controlling the setting of the sighting device in terms of the focussing of the camera.

Referring to Fig. 1, it is seen that the sighting device according to the invention comprises an objective 4 mounted in a horizontal tube 5 arranged at the shortest possible distance from the objective 3 of the camera 2. Behind the objective 4 is arranged a mirror 6 pivoted about a vertical axis 7, the rotation of the mirror being controlled by means of a device described below, in a manner to project laterally into the transverse tube 8 the light rays emitted by the object onto which is focussed the objective 3. In this transverse tube 8 is mounted a simple or composite lens 9 forming part of the sighting objective 4, as well as a mirror 10 inclined by 45° and projecting the received rays horizontally into a tube 11 at the ingoing end of which is arranged a collecting lens 12 immediately followed or preceded by a frame having the exact dimensions of the image projected on the film by the camera objective 3. The lenses 4 and 9, constituting together the sighting objective, are determined in a manner to give the image of the object sighted, in the plane of the frame 13. After the frame, is arranged inside the tube 11 a device for turning the image upright, consisting for instance, in a known manner, in a mirror having a V-shaped section 14 with its edge 15 vertical and a second mirror having a V-shaped section 16 with its edge 17 horizontal, the first of these mirrors having the effect of turning the picture upside down, and the second of turning it right side left. After this turning device 14—17 there is provided a lens 18 giving the operator an enlarged image of the image formed in the plane of frame 13 by the sighting objective 4—9. The horizontal tube 11 could, of course, also be arranged for instance along the upper panel of the camera instead of being fixed to the lateral panel of the latter, the entire device remaining the same and being simply turned by 90° about the axis of lens 4.

The objectives 3 and 4 may also be arranged in two different horizontal planes, in which case the tubes 8 and 11 will be directed in a manner to correct the vertical parallactic displacement.

As has been indicated above, the rotation of mirror 6 is controlled automatically by the focussing of the camera, for instance by the longitudinal displacements of the objective 3. Since, however, these displacements are not the same for the various objectives with different focal distances, as may be used in the same camera according to the kind of scenes to be taken, it is necessary to provide between the objective 3 and the pivoting mirror 6 a transmission with a variable ratio. A simple embodiment of a transmission of this kind is represented in Figures 2 and 3. In this device, a lug 19 integral with the mounting of the sliding objective 3 actuates a lever 20 pivoted about a vertical axis 21 on a support 22 integral with the tube 8. The lever 20 carries a longitudinal groove 23 in which an adjustable setting pin 24 may glide, the latter being in contact with another lever 25 keyed on the axis 7 of the mirror 6. It will be seen that under these conditions, the value of the angle turned through by the mirror 6 will, for a given displacement of the objective 3, be the greater the lower the position occupied by the pin 24 in the groove 23 of lever 22. In the case where the displacements of the mounting of the objective 3 are controlled, in turn, by a device with an adjustable transmission ratio according to the particular objective used, the mirror 6 may, of course, be controlled directly by the device controlling the focussing of the camera, and not by the objective 3.

What I claim is:

1. In a moving picture camera including a camera objective with focussing means for the latter, a view finder comprising an object lens rigidly fixed on the front of the camera in the immediate vicinity of the camera objective, a magnifying lens rigidly fixed on one of the outer panels of the camera and providing an enlarged image of the image given by said fixed object lens, an adjustable mirror pivotally mounted inside the camera behind said fixed object lens so as to project substantially at right angles the light received from said fixed object lens, means for automatically tilting said adjustable mirror by the camera objective focussing means for correcting the parallax error, a second mirror rigidly fixed outside the camera for projecting on said fixed magnifying lens the light received from said adjustable mirror, a frame having the same dimensions as the film frame and arranged behind said fixed mirror, a collecting lens arranged close to said frame, and an image erecting device arranged between said collecting lens and said magnifying lens and consisting of two mirrors having a V-shaped cross-section, the edges of which are arranged at right angles.

2. In a moving picture camera including a camera objective with focussing means for the latter, a view finder comprising an object lens rigidly fixed on the front of the camera in the immediate vicinity of the camera objective, a magnifying lens rigidly fixed on one of the outer panels of the camera and providing an enlarged image of the image given by said fixed object lens, an adjustable mirror pivotally mounted inside the camera behind said fixed object lens so as to project substantially at right angles the light received from said fixed object lens, means for automatically tilting said adjustable mirror by the camera objective focussing means for correcting the parallax error, said latter means consisting in a transmission with a variable ratio comprising a lug integral with the mounting of the camera objective, a pivoted lever actuated by said lug and provided with a longitudinal groove, a pin adjustably fixed in said groove, and a second lever integral with said adjustable mirror and actuated by said pin.

MAURICE ALBERT DALOTEL.

REFERENCES CITED

The following references are of record in the file of this patent:

UNITED STATES PATENTS

| Number | Name | Date |
|---|---|---|
| 1,583,706 | Tessier | May 4, 1926 |
| 2,123,494 | Barnack | July 12, 1938 |
| 1,295,062 | Reynolds | Feb. 18, 1919 |
| 2,032,061 | Kuppenbender | Feb. 25, 1936 |
| 1,607,984 | Jenkins | Nov. 23, 1926 |
| 1,767,847 | Howell | June 24, 1930 |
| 1,744,788 | Mery | Jan. 28, 1930 |
| 1,998,568 | Barenyi | Apr. 23, 1935 |
| 2,180,013 | Mihalyi | Nov. 14, 1939 |
| 1,687,030 | Mitchell | Oct. 9, 1928 |